US006862446B2

(12) United States Patent
O'Neill et al.

(10) Patent No.: US 6,862,446 B2
(45) Date of Patent: Mar. 1, 2005

(54) METHODS AND APPARATUS FOR THE UTILIZATION OF CORE BASED NODES FOR STATE TRANSFER

(75) Inventors: Alan O'Neill, Henley Beach (AU); M. Scott Corson, Chatham, NJ (US); George Tsirtsis, London (GB); Vincent Park, Budd Lake, NJ (US)

(73) Assignee: Flarion Technologies, Inc., Bedminster, NJ (US)

(*) Notice: Subject to any disclaimer, the term of this patent is extended or adjusted under 35 U.S.C. 154(b) by 39 days.

(21) Appl. No.: 10/369,998

(22) Filed: Feb. 18, 2003

(65) Prior Publication Data

US 2004/0203711 A1 Oct. 14, 2004

Related U.S. Application Data

(60) Provisional application No. 60/444,299, filed on Jan. 31, 2003.

(51) Int. Cl.[7] ............................. H04Q 7/20; H04Q 7/00; H04Q 7/24
(52) U.S. Cl. ................. 455/422.1; 455/423; 455/432.1; 455/435.1; 455/436; 370/328; 370/331; 370/338
(58) Field of Search ........................ 455/432.1, 432.2, 455/432.3, 433, 435.1, 436–444, 560, 423, 424, 422.1; 370/328, 332, 331, 338, 401; 379/333

(56) References Cited

U.S. PATENT DOCUMENTS

| | | | |
|---|---|---|---|
| 5,200,952 A | | 4/1993 | Bernstein et al. |
| 5,229,992 A | | 7/1993 | Jurkevich et al. |
| 5,247,516 A | | 9/1993 | Bernstein et al. |
| 5,251,209 A | | 10/1993 | Jurkevich et al. |
| 5,574,720 A | * | 11/1996 | Lee .............................. 370/229 |
| 6,163,692 A | * | 12/2000 | Chakrabarti et al. ......... 455/416 |
| 6,366,561 B1 | | 4/2002 | Bender |
| 2003/0078047 A1 | * | 4/2003 | Lee et al. .................... 455/445 |
| 2003/0119488 A1 | * | 6/2003 | Hans et al. ................. 455/412 |
| 2003/0214922 A1 | * | 11/2003 | Shahrier ..................... 370/331 |
| 2004/0018841 A1 | * | 1/2004 | Trossen ...................... 455/436 |

FOREIGN PATENT DOCUMENTS

| | | | | |
|---|---|---|---|---|
| JP | 2000125343 A | * | 4/2000 | ............ H04Q/7/34 |
| JP | 2001217830 A | * | 8/2001 | ........... H04L/12/24 |
| WO | WO/9847302 | | 10/1998 | |
| WO | WO 01/58196 A1 | * | 8/2001 | ............ H04Q/7/38 |

OTHER PUBLICATIONS

C. Perkins, "IP Mobility Support", Request for Comments 2002, Internet Engineering Task Force, Oct. 1996.*

(List continued on next page.)

Primary Examiner—William Trost
Assistant Examiner—Meless Zewdu
(74) Attorney, Agent, or Firm—Michael P. Straub; Straub & Pokotylo

(57) ABSTRACT

Methods and apparatus for storing, manipulating, retrieving, and forwarding state, e.g., context and other information, used to support communications sessions with one or more end nodes, e.g., mobile devices, are described. Various features are directed to a mobile node controlling the transfer of state from a first access node to a second access node during a handoff operation thereby eliminating any need for state transfer messages to be transmitted between the second access node and the first access node during handoff. Other features of the invention are directed to the use of a core network node to store state information. State information stored in the core node can be accessed and used by access nodes in cases where a mobile node does not send a state transfer message during a handoff, e.g., because communication with the first access node is lost or because such messages are not supported.

20 Claims, 10 Drawing Sheets

OTHER PUBLICATIONS

C Perkins, Editor "IP Mobility Support", Network Working Group, pp. 1–79 (Oct. 1996).

Li, Yalun "Protocol Architecture for Universal Personal Computing" IEEE Journal of Selected Areas in Communications 15(8): 1467–1476 (1997).

J. Moy, Editor "OSPF Version 2", Network Working Group, pp. 1–244 (Apr. 1998).

Valko, Andras "Cellular IP: A New Approach to Internet Host Mobility" Computer Communications Review 29(1): 50–65 (1999).

TIA/EIZ/IS–707A.8 "Data Service Options for Spread Spectrum Systems: Radio Link Protocol Type 2", pp. 1–1:4:2 (Mar. 1999).

* cited by examiner

METHODS AND APPARATUS FOR THE UTILIZATION OF CORE BASED NODES FOR STATE TRANSFER

RELATED APPLICATIONS

The present application claims the benefit of U.S. Provisional Patent Application Ser. No. 60/444,299 filed Jan. 31, 2003 which has the same title as the present application and which is hereby expressly incorporated by reference.

BACKGROUND OF INVENTION

Communications system frequently include a plurality of network nodes which are coupled to access nodes through which end nodes, e.g., mobile devices, are coupled to the network. Network nodes may be arranged in a hierarchy. Access Authentication and Authorization (AAA) servers are nodes which are normally placed relatively high in the network hierarchy. They normally provide information used for security and access control purposes. Access nodes frequently have a secure link with an AAA server in cases where such servers are used. The secure link may be through one or more node in the hierarchy.

Operators typically manage access sessions in IP networks using the RADIUS protocol and associated RADIUS AAA servers. In the future, AAA systems may be based on new protocols such as DIAMETER. In a system using a RADIUS AAA server, when a user attempts to gain access to an operator network, for the duration of an access session, the local Access Router normally issues one or more RADIUS Access-Requests to an Authentication Server to authenticate that user based on its identity such as a Network Access Identifier (NAI). The AAA database typically has stored the identities of those users allowed to access its system along with the services features they are able to invoke. When the user is successfully authenticated, its access port on the access device is configured with policy state commensurate with the user's service Authorization. The service authorization is normally delivered via RADIUS to the Access Router by the Authorization Server. Whilst authorized, service usage during an access session is recorded by the Access Router, and sent as accounting records to an Accounting Server using Accounting-Request messages in the RADIUS protocol. The Accounting Server may be part of the AAA server or it may be an independent server using the same protocol with the authorization server. If the user is connected to multiple Access Routers during a single session then the multiple sessions need to be aggregated in the Accounting Servers.

In addition to authorization and accounting issues, communications systems which support mobile devices need to include mechanisms for conveying location information so that a mobile device can change its point of attachment to the network and still have signals, e.g., IP packets, routed to it.

Mobile IP, (versions 4 and 6) also known as MIPv4 [MIPv4] and MIPv6 [MIPv6], enables a mobile node (MN) to register its temporary location indicated by a care-of-address (CoA) to its Home Agent (HA). The HA then keeps a mapping (also called a binding) between the MN's permanent address, otherwise called Home Address (HoA), and the registered CoA so that packets for that MN can be redirected to its current location using IP encapsulation techniques (tunneling). The CoA used by a MN can be an address that belongs to a Foreign Agent (FA) in an Access Router when MIPv4 is used or it can be a temporarily allocated address to the MN itself, from the Access Router prefix, in which case it is called a collocated care-of-address (CCoA). The latter model also applies to MIPv4 while it is the only mode of operation in MIPv6. Note that for the purpose of this document the terms CCoA and CoA as well as Registration and Binding Update (BU) are interchangeable since they are the corresponding terms for MIPv4 and MIPv6. The methods and apparatus of the invention are applicable to both MIPv4 and MIPv6 unless otherwise mentioned.

AAA systems are typically used with mobile IP to manage IP address allocations (HoAs), to dynamically allocate HAs, to distribute MN profiles to the Access Router and also to distribute security keys to authenticate MIP messages and to secure the air-link. The Mobile Node, an end node which is capable of changing its point of network attachment, typically sends a MIP message to gain access to the system, which triggers a AAA request to authenticate and authorize the Mobile Node. The AAA MN profile and security state is then passed from the AAA system to the Access Router to control services consumed by the MN.

MNs may change their point of network attachment, e.g., as they move from one cell to another cell. This involves changing the MNs point of attachment from a first access node, e.g., a first router, to a second access node, e.g., a second router. This processes is commonly known as a handoff. As part of a handoff the MN's CoA/CCoA needs to be updated and then transferred into the HA using MIP signaling so that packets are redirected to the MN via the new Access Router. As part of handoff process, it is necessary to transfer at least some of the first access router's state information corresponding to the MN involved in the handoff to the new access router so that the MN service is not interrupted. This process is known as State Transfer. State transfer may include, e.g., the transfer of AAA profile state information that was previously delivered via RADIUS to the AR, at which the MN access session commenced. It also may include, e.g., the transfer of air-link security vectors, MN-NAI, MN IP Address, MN-EUI-64, remaining MIP Registration Lifetime, MN multicast group membership, admission control state, resource reservation state, diff-serv state, SIP session state, compressor state, MN scheduling history and/or many other potential items of MN specific AR state information.

In at least one known system, the transfer of state information during a handoff is accomplished by the new access node to which a mobile node is connecting sending a state transfer message through the communications network to the old access node to which the mobile node was connected. In response the old access node forwards state information to the new access node. This technique, while effective, has the disadvantage of requiring that a message be sent between the old and new access nodes to initiate the transfer of the state information. The links between access nodes used for the transmission of such messages may become congested or could be used to convey other information and/or signals if the need for messages between access nodes used to initiate the transfer of state information could be eliminated.

In view of the above discussion, it should be appreciated that there is a need for new methods of implementing the communication of state information to a new access node in the case of a mobile node handoff or in other cases where a mobile node enters a new cell. It should also be appreciated that, for the reasons discussed above, avoiding the use of messages between access nodes to trigger the transfer of state information during a handoff is desirable.

SUMMARY OF THE INVENTION

In a wireless network, mobile end users use end nodes, e.g., wireless devices, to communicate with other network entities, e.g., wireless devices used by other end users, via access nodes. The access nodes may be implemented as wireless access routers. Associated with each end node there is state, e.g., a set of information comprising various parameters relating to service(s) and/or application(s) corresponding to the end node. This state is used by an access router which serves as the end node's point of network attachment. Each time the end node changes the point of attachment to the network, the state needs to be re-built or transferred to the access router which serves as the new point of network attachment so that the new access node can continue to provide communication services with regard to existing communications sessions or provide new communications services, e.g., as requested by the end node. This document describes the concept of state transfer between access points/routers as well as a novel way to gather the required state and transfer it from one point to the next.

This application describes methods for transfer of state to support events such as the movement of an end node (EN) between access nodes (ANs). The method uses Core State Management Nodes (CSMNs) located in the core of the network, to store, process and forward state information for the end nodes. The CSMNs used to store and transfer state information in accordance with the invention may be implemented as part of Authentication Authorization & Accounting (AAA) server similar to the type found in many systems.

In accordance with one feature of the invention, access nodes can store state information in a CSMN and can also retrieve, e.g., fetch, state corresponding to an end node from the CSMN used to store that information. Access nodes normally update the stored state for an end node for which they serve as the network point of attachment when the end node signals an intent to end communication with the access node or communication ceases, e.g., because communication with the access node is interrupted or terminated prior to completion of a handoff operation.

An access node normally retrieves state information from the CSMN when communication with an end node is initiated, e.g., when the end node enters the cell corresponding to the access node. However, in the case of a handoff, in some embodiments, state information is forwarded from the access node which was previously servicing the end node eliminating the need to retrieve state information from the CSMN.

In accordance with one feature of the invention, during handoff, the mobile node controls the forwarding of state from the first to the second access node being used by the end node. This is accomplished by the end node sending a message to the first access node to forward state information to the second access node. This approach avoids the need for the second node to send a message to the first node requesting the transfer of state information thereby reducing the amount of signaling between access nodes as compared to system which employ such state transfer messages between access nodes.

In cases where communication is lost with the first access node before the end node can transmit the state transfer signal, the second access node will retrieve the state information from the CSMN. Use of the transfer message is optional but has the advantage of reducing the number of information retrieval operations which need to be supported by the core node. In addition, the use of the transfer message directed from the end node to the first access node has the advantage of reducing delays in terms of the amount of time between when the end node begins communication with the second access node and when the second access node obtains the state information to be used in servicing the end node. The state transfer message may trigger updating of the state information in the core node in addition to the transfer of state information to the second access node.

State information stored by an access node in the CSMN and/or transferred to another access node will normally reflect any local changes to that state, e.g., changes made at the access node which is storing or transferring the state subsequent to the state information being received either from the CSMN or another access node. Stored state may also be manipulated and modified by the CSMN itself, e.g., as system or session requirements change during an end node access session or other communication operation.

Additional features and benefits of the present invention are discussed in the detailed description which follows.

DETAILED DESCRIPTION

The methods and apparatus of the present invention for storing, manipulating, retrieving, and forwarding state, e.g., context and other information, used to support communications sessions with one or more end nodes, e.g., mobile devices, can be used with a wide range of communications systems. For example the invention can be used with systems which support mobile communications devices such as notebook computers equipped with modems, PDAs, and a wide variety of other devices which support wireless interfaces in the interests of device mobility.

Figure 1:
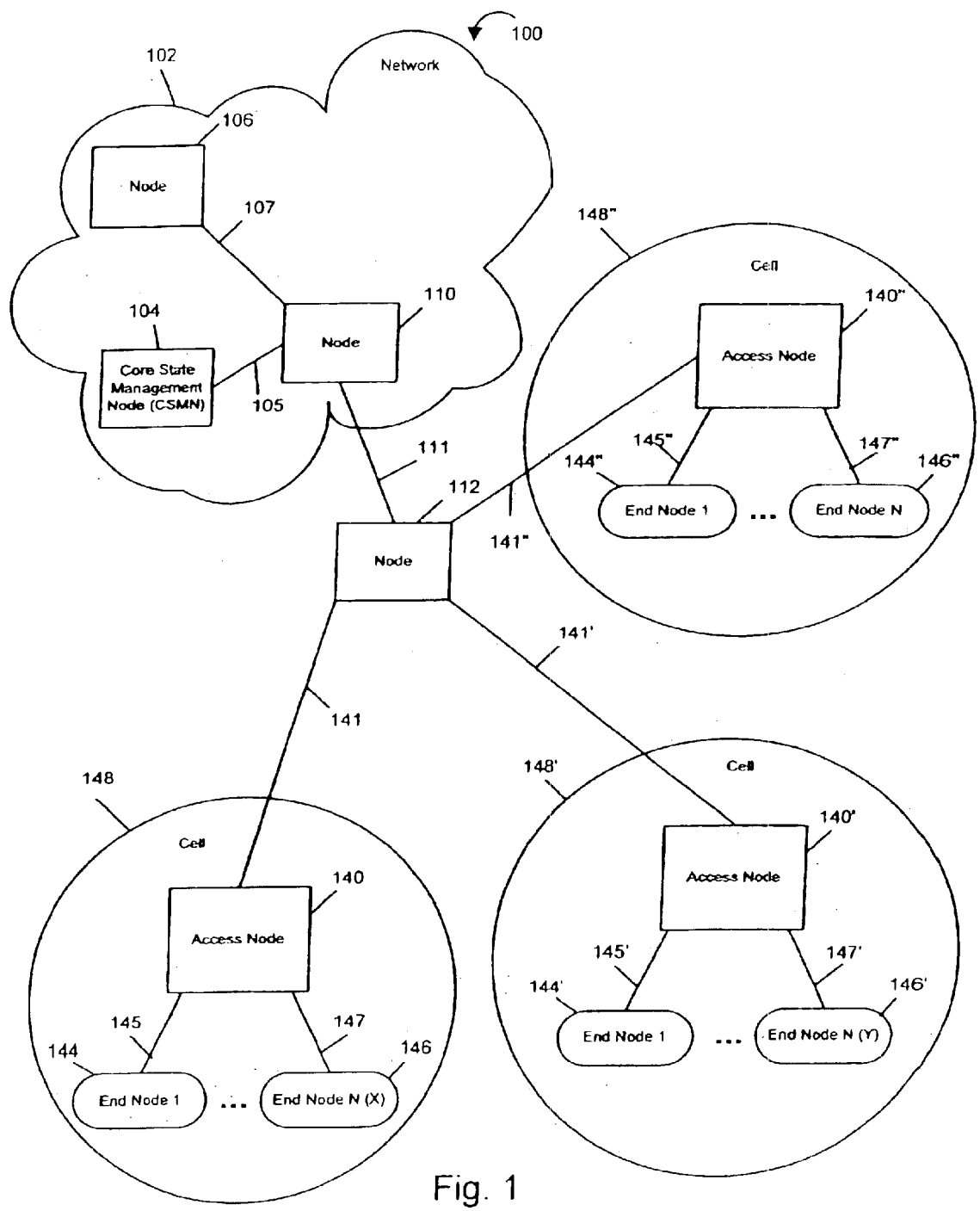
FIG. 1 illustrates a network diagram of an exemplary communications system in which the invention is applicable.

FIG. 1 illustrates an exemplary communication system 100, e.g., a cellular communication network, which comprises a plurality of nodes interconnected by communications links. Nodes in the exemplary communication system 100 exchange information using signals, e.g., messages, based on communication protocols, e.g., the Internet Protocol (IP). The communications links of the system 100 may be implemented, for example, using wires, fiber optic cables, and/or wireless communications techniques. The exemplary communication system 100 includes a plurality of end nodes 144, 146, 144', 146', 144'', 146'', which access the communication system via a plurality of access nodes 140, 140', 140". The end nodes 144, 146, 144', 146', 144", 146" may be, e.g., wireless communication devices or terminals, and the access nodes 140, 140', 140" may be, e.g., wireless access routers or base stations. The exemplary communication system 100 also includes a number of other nodes 104, 106, 110, and 112, used to provide interconnectivity or to provide specific services or functions. Specifically, the exemplary communication system 100 includes a Core State Management node (CSMN) 104, used to support transfer and storage of state pertaining to end nodes. The CSMN node may be part of an AAA server.

The FIG. 1 exemplary system 100 depicts a network 102 that includes the CSMN 104 and the node 106, both of which are connected to an intermediate network node 110 by a corresponding network link 105 and 107, respectively. The intermediate network node 110 in the network 102 also provides interconnectivity to network nodes that are external from the perspective of the network 102 via network link 111. Network link 111 is connected to another intermediate network node 112, which provides further connectivity to a plurality of access nodes 140, 140', 140" via network links 141, 141', 141", respectively.

Each access node 140, 140', 140" is depicted as providing connectivity to a plurality of N end nodes (144, 146), (144', 146'), (144", 146"), respectively, via corresponding access links (145, 147), (145', 147'), (145", 147"), respectively. In the exemplary communication system 100, each access node 140, 140', 140" is depicted as using wireless technology, e.g., wireless access links, to provide access. A radio coverage area, e.g., communications cell, 148, 148', 148" of each access node 140, 140', 140", respectively, is illustrated as a circle surrounding the corresponding access node.

The exemplary communication system 100 is subsequently used as a basis for the description of various embodiments of the invention. Alternative embodiments of the invention include various network topologies, where the number and type of network nodes, the number and type of access nodes, the number and type of end nodes, the number and type of CSMNs, the number and type of links, and the interconnectivity between nodes may differ from that of the exemplary communication system 100 depicted in FIG. 1.

In various embodiments of the present invention some of the functional entities depicted in FIG. 1 may be omitted or combined. The location or placement of these functional entities in the network may also be varied.

Figure 2:
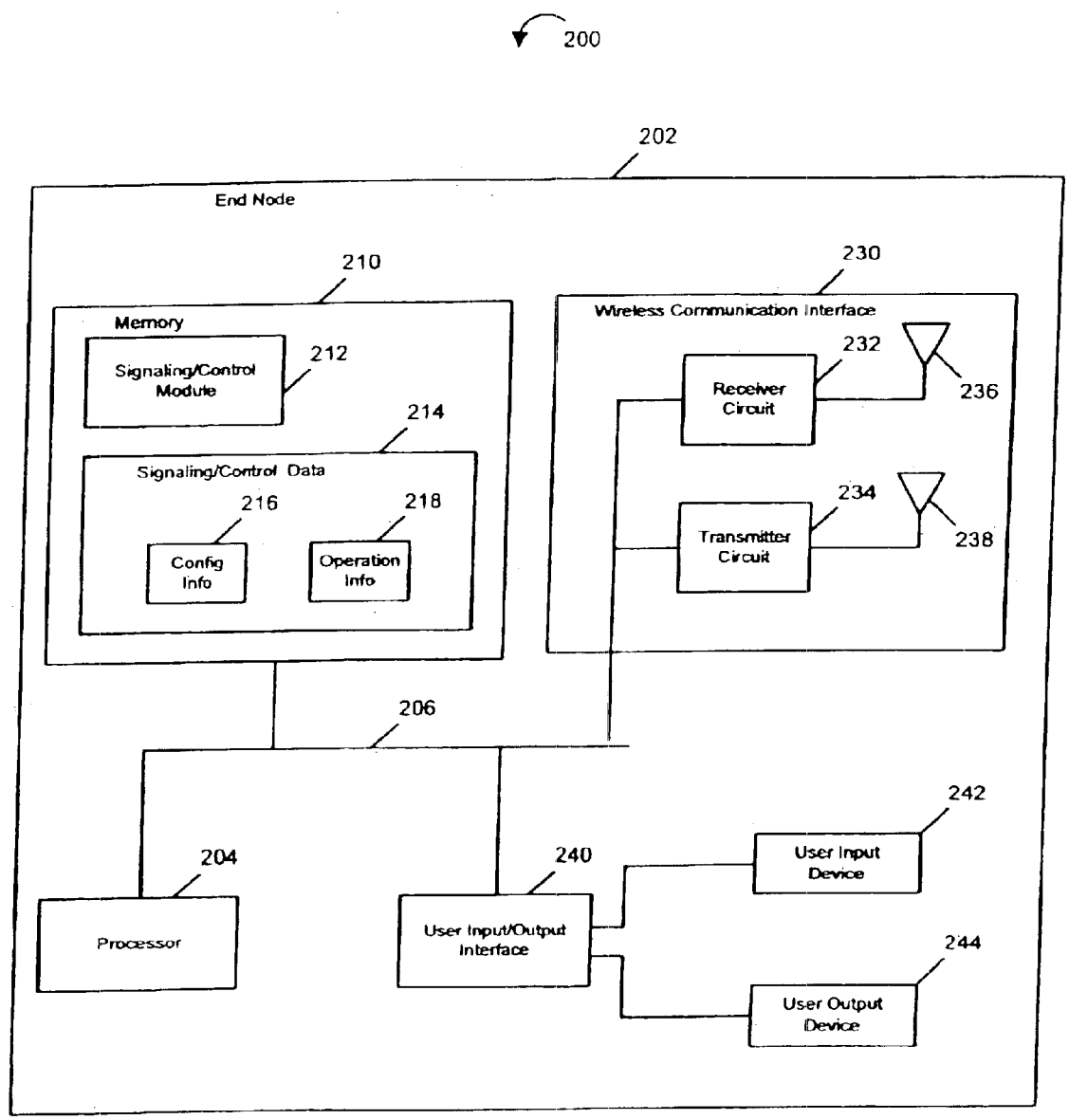
FIG. 2 illustrates an exemplary end node implemented in accordance with the present invention.

FIG. 2 provides a detailed illustration of an exemplary end node 200 implemented in accordance with the present invention. The exemplary end node 200, depicted in FIG. 2, is a detailed representation of an apparatus that may be used as any one of the end nodes 144, 146, 144', 146', 144", 146", depicted in FIG. 1. In the FIG. 2 embodiment, the end node 200 includes a processor 204, a wireless communication interface 230, a user input/output interface 240 and memory 210 coupled together by bus 206. Accordingly, via bus 206 the various components of the end node 200 can exchange information, signals and data. The components 204, 206, 210, 230, 240 of the end node 200 are located inside a housing 202.

The wireless communication interface 230 provides a mechanism by which the internal components of the end node 200 can send and receive signals to/from external devices and network nodes, e.g., access nodes. The wireless communication interface 230 includes, e.g., a receiver circuit 232 with a corresponding receiving antenna 236 and a transmitter circuit 234 with a corresponding transmitting antenna 238 used for coupling the end node 200 to other network nodes, e.g., via wireless communications channels.

The exemplary end node 200 also includes a user input device 242, e.g., keypad, and a user output device 244, e.g., display, which are coupled to bus 206 via the user input/output interface 240. Thus, user input/output devices 242, 244 can exchange information, signals and data with other components of the end node 200 via user input/output interface 240 and bus 206. The user input/output interface 240 and associated devices 242, 244 provide a mechanism by which a user can operate the end node 200 to accomplish various tasks. In particular, the user input device 242 and user output device 244 provide the functionality that allows a user to control the end node 200 and applications, e.g., modules, programs, routines and/or functions, that execute in the memory 210 of the end node 200.

The processor 204 under control of various modules, e.g., routines, included in memory 210 controls operation of the end node 200 to perform various signaling and processing as discussed below. The modules included in memory 210 are executed on startup or as called by other modules. Modules may exchange data, information, and signals when executed. Modules may also share data and information when executed. In the FIG. 2 embodiment, the memory 210 of end node 200 of the present invention includes a signaling/control module 212 and signaling/control data 214.

The signaling/control module 212 controls processing relating to receiving and sending signals, e.g., messages, for management of state information storage, retrieval, and processing. Signaling/control data 214 includes state information, e.g., parameters, status and/or other information relating to operation of the end node. In particular, the signaling/control data 214 may include configuration information 216, e.g., end node identification information, and operational information 218, e.g., information about current processing state, status of pending responses, etc. The module 212 may access and/or modify the data 214, e.g., update the configuration information 216 and/or the operational information 218.

Figure 3:
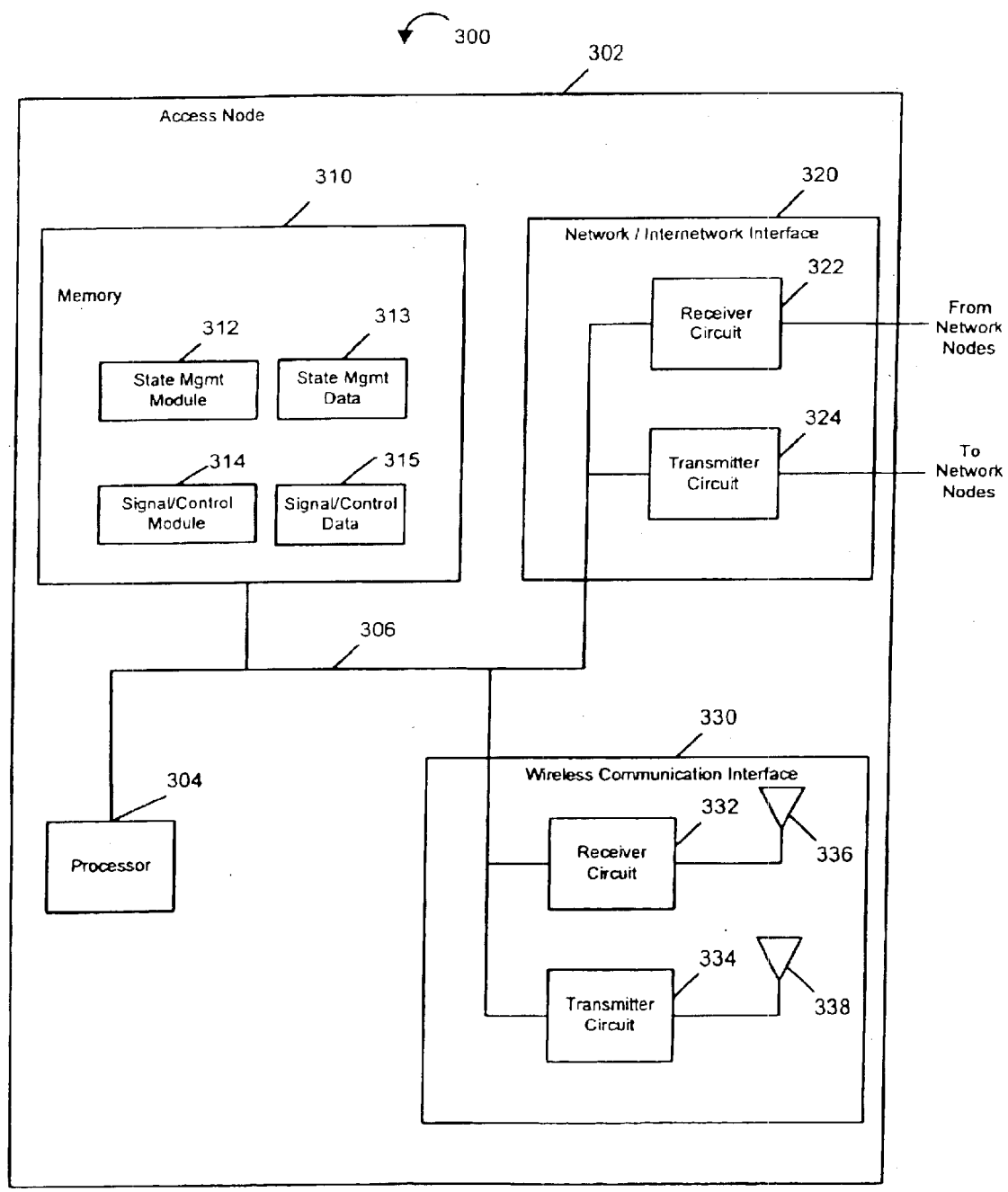
FIG. 3 illustrates an exemplary access node implemented in accordance with the present invention.

FIG. 3 provides a detailed illustration of an exemplary access node 300 implemented in accordance with the present invention. The exemplary access node 300, depicted in FIG. 3, is a detailed representation of an apparatus that may be used as any one of the access nodes 140, 140', 140" depicted in FIG. 1. In the FIG. 3 embodiment, the access node 300 includes a processor 304, memory 310, a network/internetwork interface 320 and a wireless communication interface 330, coupled together by bus 306. Accordingly, via bus 306 the various components of the access node 300 can exchange information, signals and data. The components 304, 306, 310, 320, 330 of the access node 300 are located inside a housing 302.

The network/internetwork interface 320 provides a mechanism by which the internal components of the access node 300 can send and receive signals to/from external devices and network nodes. The network/internetwork interface 320 includes, a receiver circuit 322 and a transmitter circuit 324 used for coupling the node 300 to other network nodes, e.g., via copper wires or fiber optic lines. The wireless communication interface 330 also provides a mechanism by which the internal components of the access node 300 can send and receive signals to/from external devices and network nodes, e.g., end nodes. The wireless communication interface 330 includes, e.g., a receiver circuit 332 with a corresponding receiving antenna 336 and a transmitter circuit 334 with a corresponding transmitting antenna 338. The interface 330 is used for coupling the access node 300 to other network nodes, e.g., via wireless communication channels.

The processor 304 under control of various modules, e.g., routines, included in memory 310 controls operation of the access node 300 to perform various signaling and processing. The modules included in memory 310 is executed on startup or as called by other modules that may be present in memory 310. Modules may exchange data, information, and signals when executed. Modules may also share data and information when executed. In the FIG. 3 embodiment, the memory 310 of the access node 300 of the present invention includes a State Management module 312 and a Signaling/Control module 314. Corresponding to each of these modules, memory 310 also includes State Management data 313 and the Signaling/Control data 315.

The State Management Module 312 controls the processing of received signals from end nodes or other network nodes regarding state storage and retrieval. The State Management Data 313 includes, e.g., end-node related information such as the state or part of the state, or the location of the current end node state if stored in some other network node. The State Management module 312 may access and/or modify the State Management data 313.

The Signaling/Control module 314 controls the processing of signals to/from end nodes over the wireless communication interface 330, and to/from other network nodes over the network/internetwork interface 320, as necessary for other operations such as basic wireless function, network management, etc. The Signaling/Control data 315 includes, e.g., end-node related data regarding wireless channel assignment for basic operation, and other network-related data such as the address of support/management servers, configuration information for basic network communications. The Signaling/Control module 314 may access and/or modify the Signaling/Control data 315.

Figure 4:
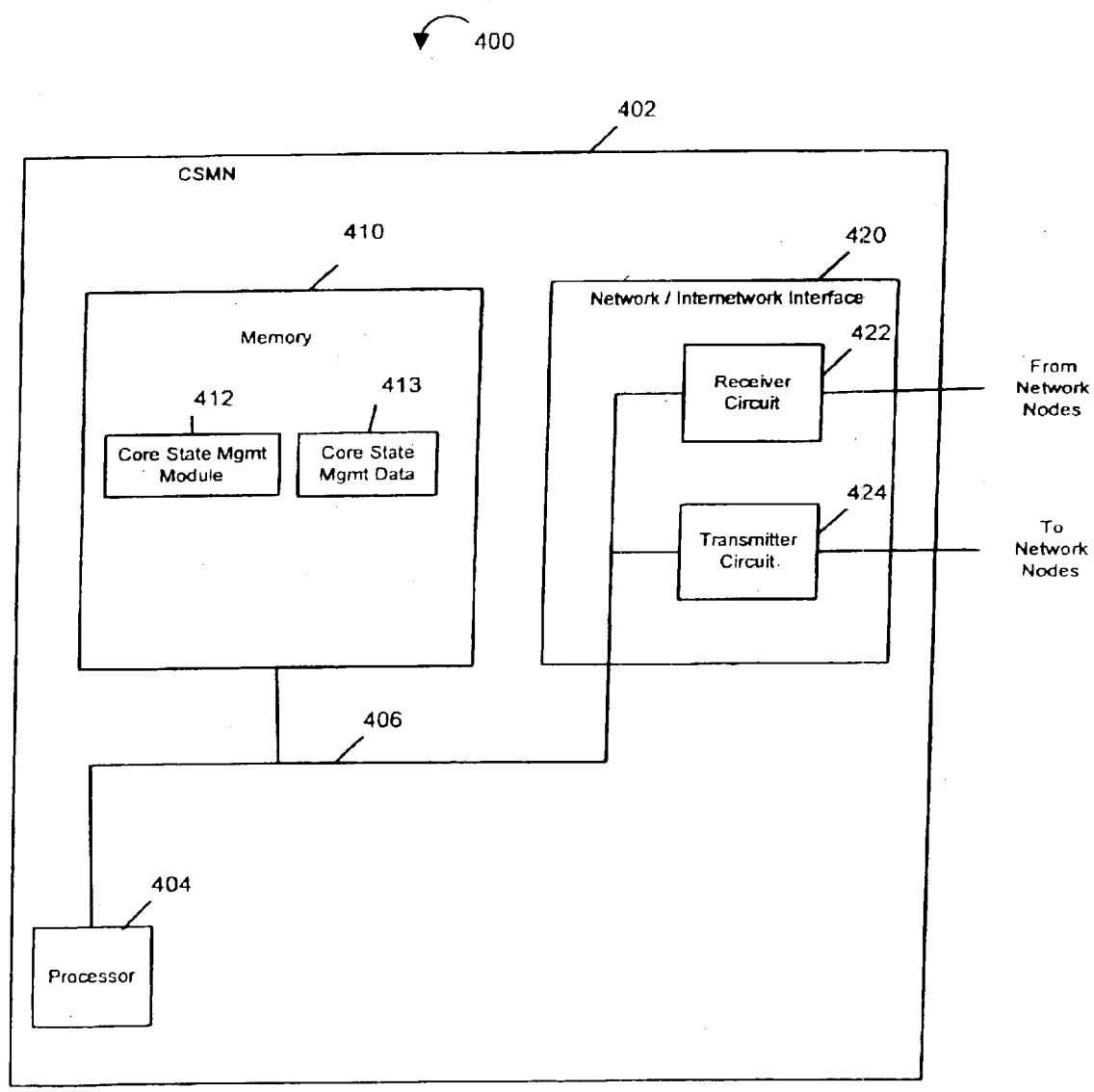
FIG. 4 illustrates an exemplary Core State Management Node implemented in accordance with the present invention.

FIG. 4 provides a detailed illustration of an exemplary Core State Management Node 400 implemented in accordance with the present invention. The exemplary CSMN 400, depicted in FIG. 4, is a detailed representation of an apparatus that may be used as the CSMN 104 depicted in FIG. 1. In the FIG. 4 embodiment, the CSMN 400 includes a processor 404, memory 410, a network/internetwork interface 420, coupled together by bus 406. Accordingly, via bus 406 the various components of the access node 400 can exchange information, signals and data. The components 404, 406, 410, 420 of the access node 400 are located inside a housing 402.

The network/internetwork interface 420 provides a mechanism by which the internal components of the CSMN 400 can send and receive signals to/from external devices and network nodes. The network/internetwork interface 420 includes, a receiver circuit 422 and a transmitter circuit 424 used for coupling the node 400 to other network nodes, e.g., via copper wires or fiber optic lines.

The processor 404 under control of various modules, e.g., routines, included in memory 410 controls operation of the CSMN 400 to perform various signaling and processing. The module included in memory 410 is executed on startup or as called by other modules that may be present in memory 410. In the FIG. 4 embodiment, the memory 410 of the CSMN 400 of the present invention includes a Core State Management module 412 and a Core State Management data 413.

The Core State Management Module 412 controls the processing of received signals from other CSMN, access nodes, or network nodes regarding state storage and retrieval. The Core State Management Data 413 includes, e.g., end-node state information. The Core State Management module 412 may access and/or modify the Core State Management data 413.

FIGS. 5, 6, 7 and 8 illustrate the signaling performed in accordance with an exemplary embodiment of the invention. The signaling is illustrated in the context of exemplary system 500, adapted from system 100 illustrated in FIG. 1. Each of the access nodes 140, 140' shown in FIGS. 5, 6, 7 and 8 are simplified representations of the exemplary access node 300 depicted in FIG. 3. Additionally, in the exemplary system 500 the end nodes 144, 146, 144', 146', 144'', 146'' (and corresponding access links 145, 147, 145', 147', 145'', 147'') from system 100 have been replaced for purposes of explaining the invention with a single end node, X 146, implemented in accordance with the invention. End node, X, 146 shown in FIGS. 5, 6, 7 and 8 is a simplified representation of end node 200 depicted in FIG. 2 and is coupled to the depicted access nodes by one or more wireless communications links.

End node state information transferred between access nodes and core state management nodes in accordance with the present invention is state information relating to, e.g., used to support, communication with the end node which operates as part of the system. In one embodiment of this invention transferred state information will typically include static, long lived and short lived components. Static components may include parameters that do not change over long periods of time and multiple communication sessions. Examples of static state are end node profile information such as general quality of service parameters (e.g.: peak rates allowed) and generic authorization state (e.g.: type of data calls allowed). Examples of long lived state are parameters that do not change during the duration of a communication session (e.g.: a dynamically assigned Internet address or some long lived security information). Examples of short lived state are parameters that are very dynamic in nature and change multiple times during a communications session (e.g.: dynamic quality of service state, multicast group membership, etc.)

In one embodiment of this invention state information (static, short and long lived) is moved together according to methods described in the present invention. In an alternative embodiment static state resides permanently in CSMNs. In this case both static and dynamic state may be transferred between CSMNs located in different regions, or from CSMN to access nodes. However, while dynamic state information is normally transferred from access nodes to CSMNs, there is no need to communicate static state information to the CSMNs since they already include the information. In an alternative embodiment, all state resides in one or more CSMNs and access nodes and/or CSMNs may update said state as state changes occur.

CSMN Operation

Figure 5:
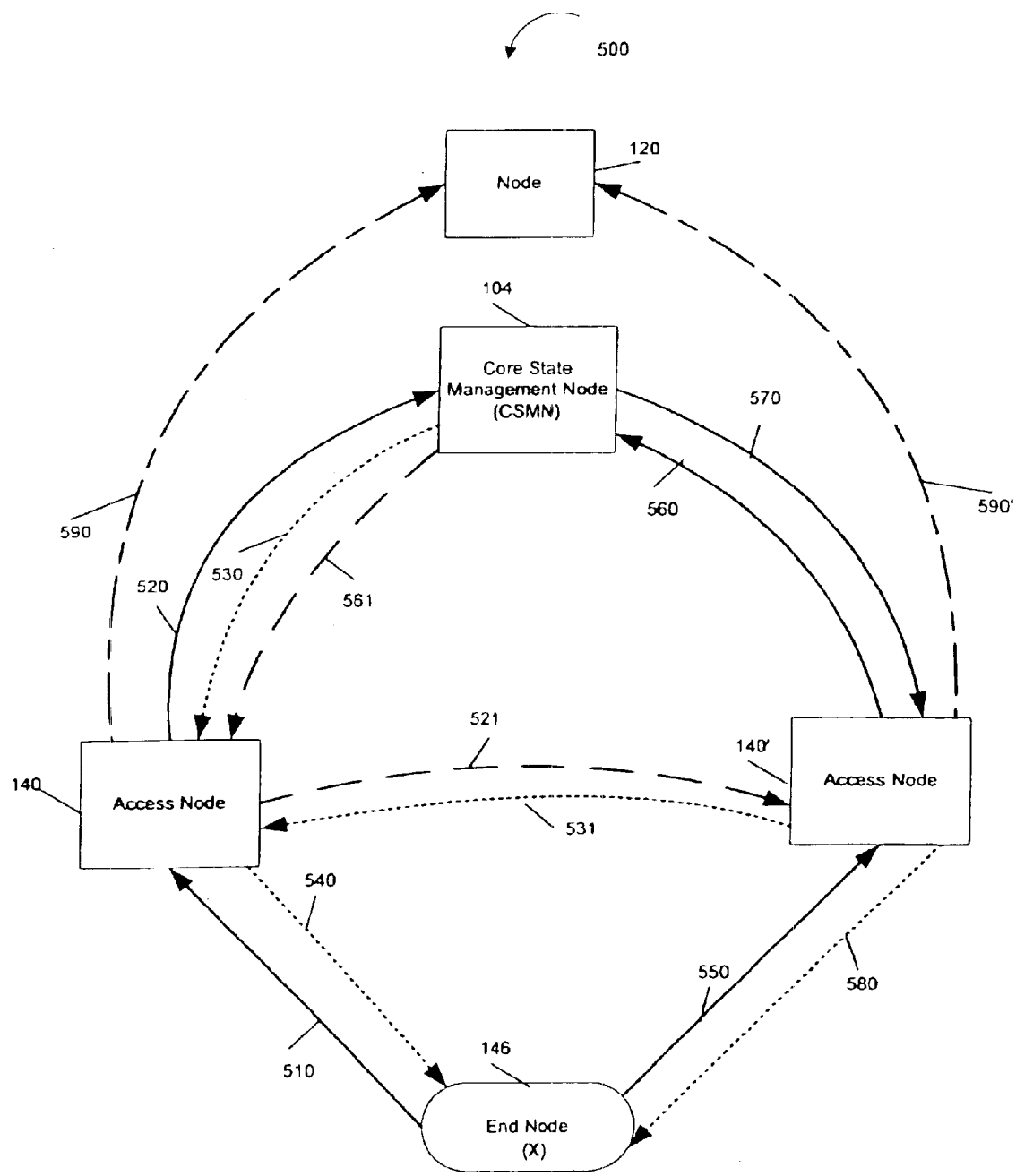
FIG. 5 illustrates signaling performed in accordance with the present invention when an end node transitions from one access node to another access node.

CSMN operation in accordance with one feature of the invention will now be described with reference to FIG. 5. FIG. 5 illustrates core state management signaling in a simplified version of the exemplary system depicted in the FIG. 1 and described above. The depicted signaling may occur as part of a handoff operation. FIG. 5 includes access nodes 140, 140' implemented according to FIG. 3, end node X 146 implemented according to FIG. 2 and a Core State Management Node (CSMN) 104 implemented according to FIG. 4. Lines between the nodes of FIG. 5 represent state management related messages sent and received according to the present invention and are explained below. Dashed lines between nodes of FIG. 5 indicate optional messages.

In FIG. 5 End Node X 146 sends, e.g., at the start of a handoff, a Store State Request (SSRQ) message 510 to Access Node 140 comprising the End Node X 146 identifier. An end node identifier may be a network address, hardware address, or other identification specific to the user or the device associated with the end node. On reception of the SSRQ message 510 the Access Node 140 searches its State Management data 313 (FIG. 3) for state information associated with said end node and sends a Access Node State Transfer Update (AN-STU) message 520 to the Core State Management Node (CSMN) 104. Said AN-STU message 520 comprises the End Node X 146 identifier and state associated with said end node as available to Access Node 140.

On reception of the AN-STU message 520 the Core State Management Module 412 (FIG. 4) of CSMN Node 104 processes the message and stores the state included in said message in its CSM data 413 (FIG. 4) such that said state is associated with the identifier of the end node also included in said message. CSMN node 104 optionally returns a State transfer Update Acknowledgement (STUAck) message 530 to Access Node 140 indicating the correct reception and storage of said state. Access Node 140 on reception of STUAck message 530 optionally sends a Store State Reply (SSRP) message 540 to End Node X 146 indicating the successful storage of said state in the core.

End Node X 146 sends a Retrieve State Request (RSRQ) message 550 to Access Node 140' comprising the End Node X 146 identifier. On reception of said RSRQ message 550 Access Node 140' sends a State Transfer Request (STRQ) message 560 comprising the identifier of End Node X 146 to CSMN node 104. On reception of said STRQ message 560, the Core State Management module 412 (FIG. 4) of CSMN node 104 processes said message and searches its core state management data 413 for state associated with the End Node X 146 indicated in said STRQ message. State associated with End Node X 146 that was earlier stored is found and a CSMN State Transfer Update (CSMN-STU) message 570 including said state and the identifier of End Node X 146 is sent to Access Node 140'. On reception of CSMN-STU message 570, Access Node 140' stores state included in said message in its state management data 313 (FIG. 3). Access Node 140' optionally sends a Retrieve State Reply (RSRP) message 580 to End Node X 146 to indicate the correct retrieval of state associated with said end node from the core.

In an alternative embodiment of this invention the SSRQ message 510 additionally includes the identifier of Access Node 140' that End Node X 146 wishes to exchange data with. In that case Access Node 140 sends an additional copy of the AN-STU message 520 to the Access Node 140' as indicated by AN-STU message 521. Access Node 140' receives said message and stores state included in said message and associated with said end node. In this embodiment of the invention when Access Node 140' receives RSRQ message 550 it first checks its state management data 313 (FIG. 3) for state associated with said end node and only sends STRQ message 560 if no state is found. In the same embodiment Access Node 140' may optionally send a STU-Ack message 531 to Access Node 140 on reception of the AN-STU message 521.

In the various embodiments described above in regard to FIG. 5, after sate information is transferred to the second access node 140', network routing information corresponding to end node x 146 is updated so that IP packets and other signals intended for end node X 146 will be directed to the second access node 140' instead of the first access node 140. This is accomplished by one of the first and second access nodes 140, 140' sending a routing message to one or more network routing devices. In the FIG. 5 example, node 120 is used to represent a routing device, e.g., a router, while messages 590 and 590' represent routing update messages transmitted by the first and second access nodes 140, 140' respectively. Normally, only one of the access nodes will be responsible for transmitting the routing update message. In most embodiments this will be the second access node 140' which transmits the message 590' once the state corresponding to end node X 146 has been successfully received.

Removal of State From CSMN

State may be removed from the CSMN, e.g., upon expiration of a timer. In one embodiment of this invention, on reception of AN-STU message 520, the CSMN 104, in addition to the processing described in the previous two sections, starts a timer of predetermined or negotiated value and associates said timer with the state included in the received message 520 and stored in its core state management data 413 (FIG. 4). When said timer expires, state associated with that timer and corresponding to an end node is removed from the core state management data 413 (FIG. 4) of CSMN node 104. Removal of end node state upon timer expiration does not depend on whether or not this state was requested through a STRQ message while the timer was valid. Furthermore, if while the timer is still valid, the CSMN receives another AN-STU message, from the same or different access node, comprising state for the same End Node X, then the CSMN re-sets the timer to its original value. Resetting the timer is done whether or not the updated state is actually the same or differs from the existing stored state.

State Unavailable

In some cases, requested state information may not be available in the CSMN. In one embodiment of this invention, if no state is available for the end node indicated in a received STRQ message 560, the CSMN 104 returns a CSMN-STU message 570 including an indication that no state is available for said end node. In an alternative embodiment of this invention if no state is available for the end node indicated in a received STRQ message 560, the CSMN 104 starts a predetermined or negotiated timer and associates it with said message 560. If state for the end node identified in message 560 is received, say in a AN-STU message 520, prior to the timer expiring, the CSMN processes message 520 as described earlier and immediately stops the timer and sends a CSMN-STU message 570 to Access Node 140'. If the timer expires and no appropriate state is received then the CSMN node 104 returns a CSMN-STU message 570 including an indication that no state is available for said end node. In a third embodiment of this invention if no state is available for the end node indicated in a received STRQ message 560, the CSMN 104 sends an optional Transfer State Request (TSRQ) message 561, comprising the identifier of End Node X 146 and the identifier of Access Node 140' that is currently requesting state, to the last access node that requested state for said end node X 146, i.e.: Access Node 140. In this case Access Node 140 sends the AN-STU message 521 to the Access Node 140' as indicated in FIG. 5. On reception of AN-STU message 521, Access Node 140' stores state included in said message in its state management data 313 (FIG. 3) and optionally returns acknowledgment message 531 to Access Node 140.

State Updates

In one embodiment of this invention state information included in an AN-STU message 520, received by CSMN node 104 overwrites any existing state information in the core state management data 413 (FIG. 4) of CSMN 104. In an alternative embodiment of this invention multiple versions of state associated with a single end node are maintained in the CSMN 104, and only removed on expiration of associated timers or other triggers such as explicit messages from other network nodes.

State Manipulation at CSMN

In one embodiment of this invention the CSMN modifies state associated with an end node according to local policy before it sends it to a requesting access node in a CSMN-STU message 570.

State indication from AN to EN

In one embodiment of this invention the RSRP message 580 from access node 140' includes an indication of the state received by the access node in a corresponding CSMN-STU message 570. In one embodiment of this invention the indication provided is a digest which allows the end node to compare the received digest with a digest of the state it had at the access node 140, and to recognize whether the state is correct or not. In cases where the end node knows that the state should match or should differ from the one stored through access node 140, the end node can take further action according to fault detection policies.

Loss of Link

In one embodiment of the present invention, Access Node 140 sends the AN-STU message 520 as soon as it detects the loss of connectivity with End Node X 146.

Core State Management Between Regions: Reactive Approach

Figure 6:
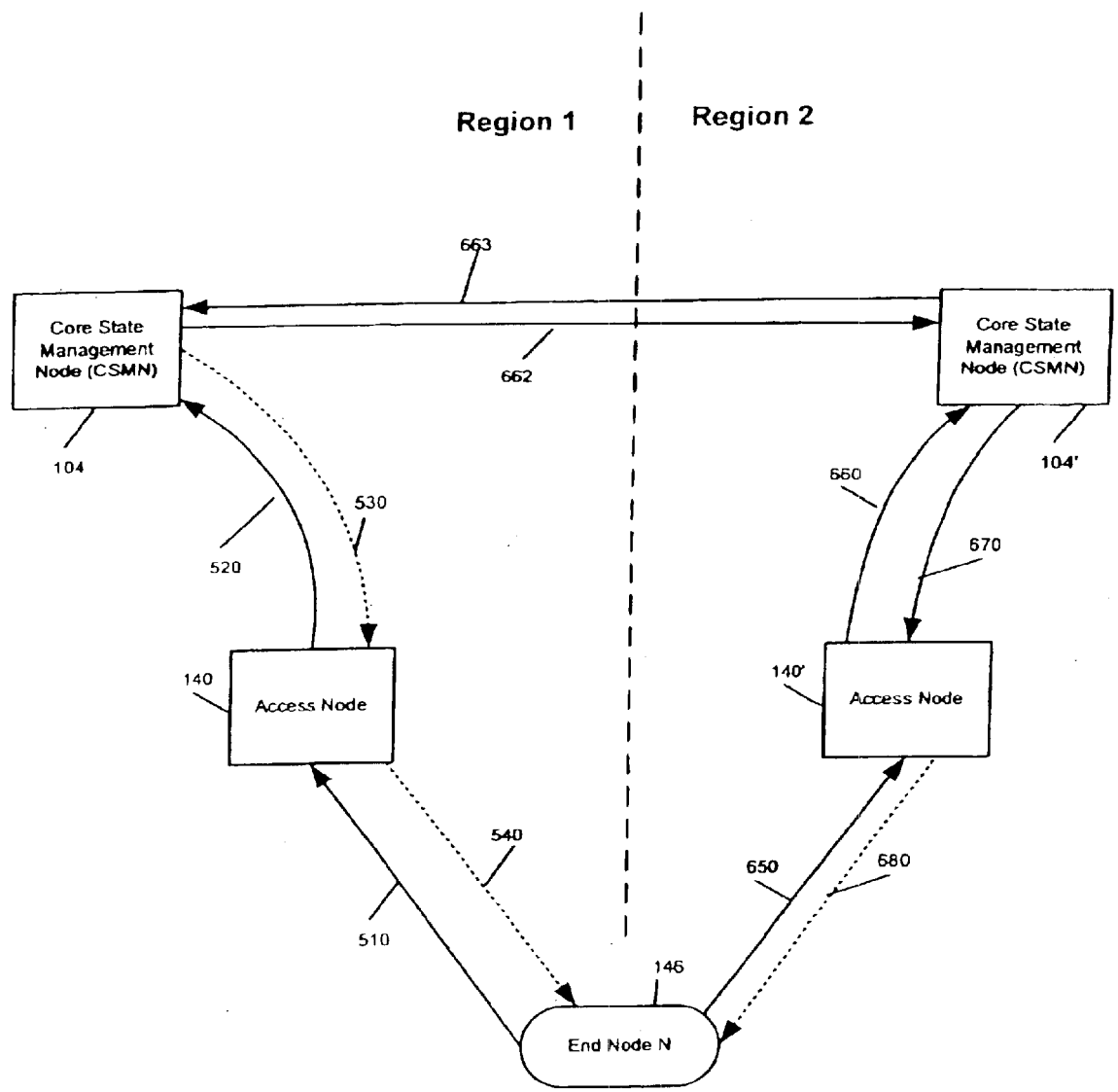
FIG. 6 illustrates signaling performed in accordance with the present invention when an end node transitions from one access node to another access node when the access nodes use different CSMN nodes.

FIG. 6 depicts an alternative embodiment of the invention in which Access Nodes 140 and 140' belong to different regions and thus store and retrieve state from different CSMN Nodes 104 and 104' respectively. In this invention the term "region" is used to identify a multitude of access nodes using the same CSMN node to store and retrieve state from/to. The breakdown of a large network into CSMN regions facilitates the scaling of state transfer methods described in this invention.

In FIG. 6 the processing and content of messages 510, 520, 530, 540 is identical to that in FIG. 5 and thus are not described again here. Messages 650, 660, 670 and 680 are variations to corresponding messages 550, 560, 570 and 580 in FIG. 5 and thus are described below together with new messages 662, 663.

State associated with End Node X 146 is stored in CSMN node 104 with the method described in FIG. 5 and messages 510, 520, 530 and 540. Following that, in this embodiment of the present invention End Node X 146 sends Retrieve State Request (RSRQ) message 650 to Access Node 140' including the End Node X 146 identifier and Region ID of the region of which Access Node 140 is a member. On reception of said RSRQ message 650 Access Node 140' sends State Transfer Request (STRQ) message 660 including the identifier of End Node X 146 and the Access Node 140 Region ID to CSMN node 104'. On reception of said STRQ message 660, the core state management module 412 (FIG. 4) of CSMN node 104' processes said message and searches its core state management data 413 for state associated with the End Node X 146 indicated in said message. State associated with End Node X 146 is not found and thus the CSMN node 104' sends Core State Transfer Request (Core-STRQ) message 663, comprising the identifier of End Node x 146, to CSMN node 104, which is the CSMN node for the Region ID indicated in message 660.

On reception of said Core-STRQ message 663, the Core State Management module 412 (FIG. 4) of CSMN node 104 processes said message and searches its Core State Management data 413 for state associated with the End Node X 146 indicated in said message. State associated with End Node X 146 that was earlier stored is found and a Core State Transfer Update (Core-STU) message 662 including said state and the identifier of End Node X 146 is sent to CSMN Node 104'. On reception of Core-STU message 662, CSMN Node 104' stores state included in said message in its Core State Management data 413 (FIG. 4) and sends CSMN-STU message 670, including state associated with End Node X 146, to the requesting Access Node 140'. On reception of CSMN-STU message 670, Access Node 140' stores state included in said message in its state management data 313 (FIG. 3). Access Node 140' optionally sends Retrieve State Reply (RSRP) message 680 to indicate the correct retrieval of state associated with said end node from the core.

Region ID to CSMN Mapping

In one embodiment of this invention the Region ID referred to above identifies the CSMN node of the same region. In an alternative embodiment of this invention the Region ID is of a structure that allows the resolution of that ID to an ID that identifies the CSMN Node of that Region.

Core State Management Between Regions: Proactive

Figure 7:
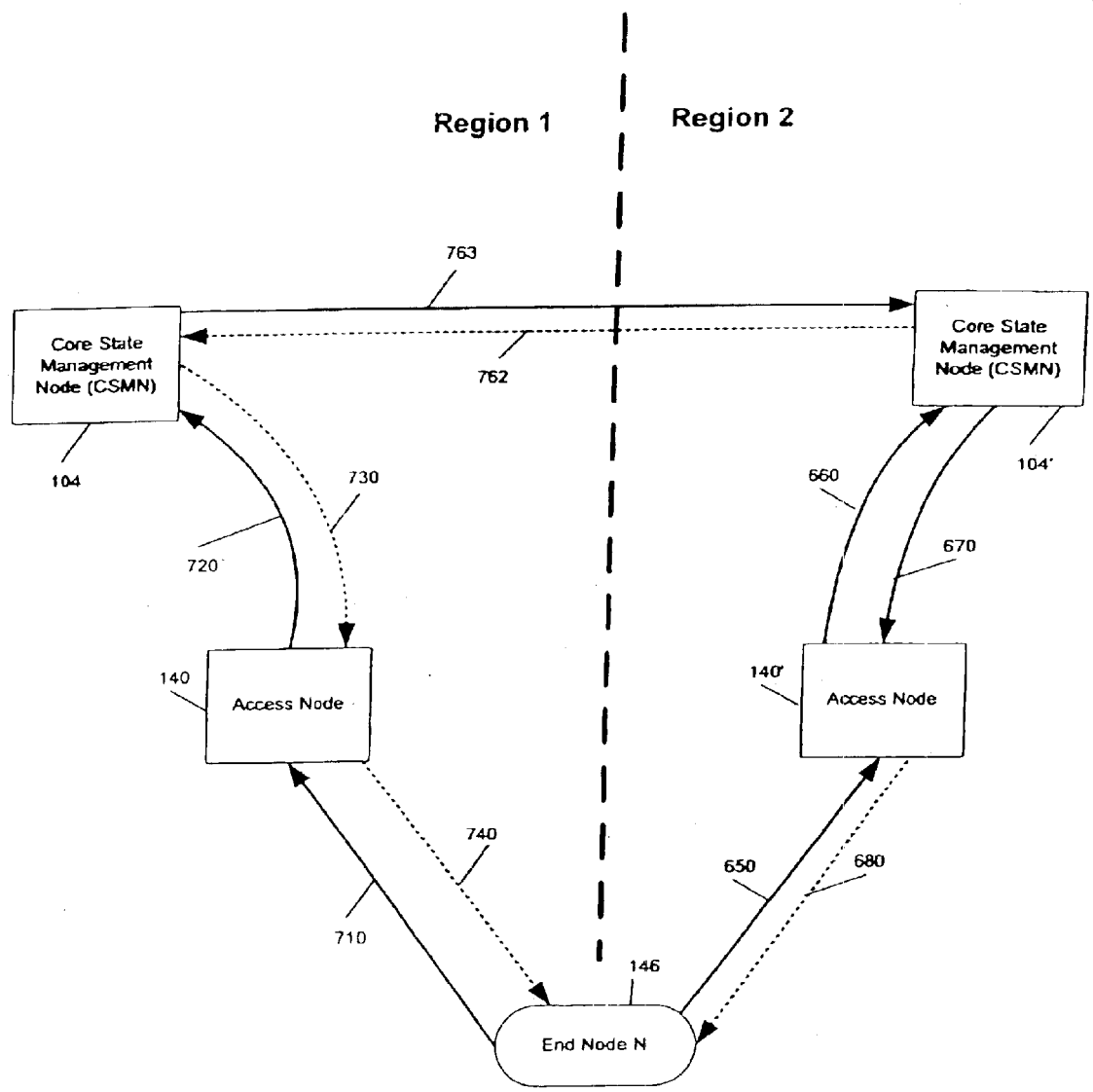
FIG. 7 illustrates alternative signaling performed from FIG. 6.

FIG. 7 depicts an alternative method from that described in FIG. 6. In FIG. 7 End Node X 146 sends Store State Request (SSRQ) message 710 to Access Node 140 including the End Node X 146 identifier and the Region ID corresponding to Access Node 140'. On reception of SSRQ message 710 the Access Node 140 searches its state management data 313 (FIG. 3) for state associated with said end node and sends a Access Node State Transfer Update (AN-STU) message 720 to the Core State Management Node (CSMN) 104. Said AN-STU message 720 includes the End Node X 146 identifier, the state associated with said end node as available to Access Node 140, and the Region ID that was included in SSRQ message 710.

On reception of AN-STU message 720, the core state management module 412 (FIG. 4) of CSMN Node 104 processes the message, stores the state included in said message in its core state management data 413 (FIG. 4) such that said state is associated with the identifier of the end node also included in said AN-STU message 720. CSMN Node 104 also observes the Region ID in message 720 and thus sends a Core-STU message 763 to CSMN node 104' which is the CSMN of the region associated with said Region ID. CSMN node 104' optionally returns Core State Transfer Update Acknowledgement (Core-STUAck) message 762 to CSMN Node 104 indicating the correct reception and storage of said state. CSMN node 104 also optionally returns State transfer Update Acknowledgement (STUAck) message 730 to Access Node 140 indicating the correct reception and storage of said state. Access Node 140 on reception of STUAck message 730 optionally sends a Store State Reply (SSRP) message 740 to End Node X 146 indicating the successful storage of said state in the core.

Messages 650, 660, 670 and 680 are now generated, processed and exchanged in the same way as described in FIG. 6, the difference being that CSMN node 104' has state associated with End Node X 146 in its core state management data 413 (FIG. 4) when it receives STRQ message 660 from Access Node 140'. For that reason the CSMN-STU message 670 is immediately returned.

Hierarchical Core State Management

Figure 8:
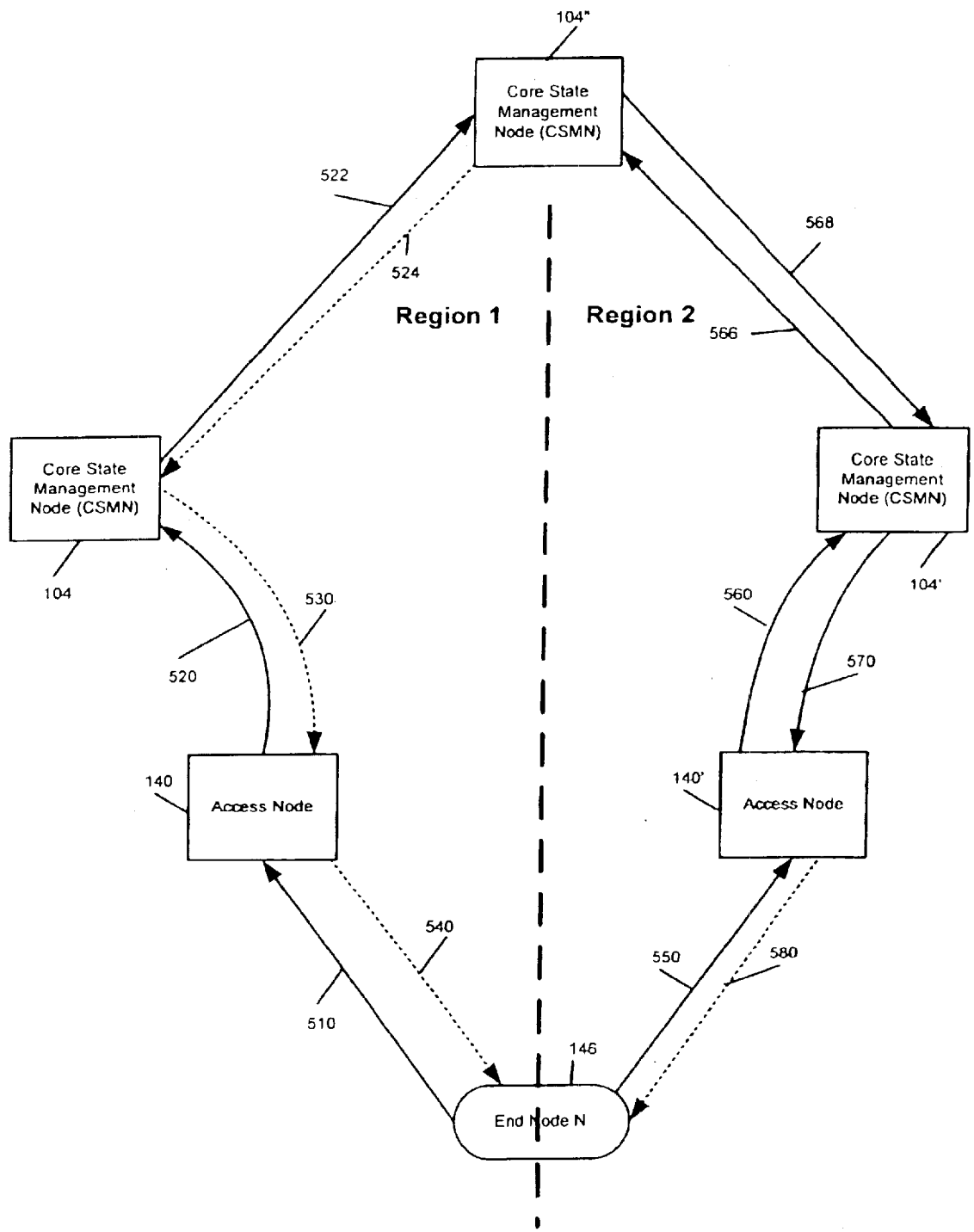
FIG. 8 illustrates alternative signaling performed from FIGS. 6 & 7 when CSMNs are arranged in a hierarchy.

FIG. 8 depicts an alternative embodiment of this invention in which CSMN Nodes are arranged in a hierarchy so that high level CSMN Node 104" maintains copies of all or a part of the state maintained by low level CSMN nodes 104 and 104'. In FIG. 8 messages 510, 520, 530, 540, 550, 560, 570 and 580 are identical to those described in FIG. 5. The difference is that when the CSMN 104 receives message 520, in addition to the processing described in FIG. 5, the CSMN also sends a State Transition Update (STU') message 522 to CSMN Node 104".

On reception of said STU' message 522 including said state and the identifier of End Node X 146, CSMN Node 104" stores the state included in said message in its Core State Management data 413 (FIG. 4) and optionally returns a STUAck' message 524 to CSMN Node 104 to indicate correct reception and storage of state. In addition, on reception of STRQ message 560, the core state management module 412 (FIG. 4) of CSMN node 104' processes said message and searches its core state management data 413 for state associated with the End Node X 146 indicated in said message. State associated with End Node X 146 is not found and thus the CSMN node 104' sends State Transfer Request (STRQ") message 566, including the identifier of End Node X 146 to CSMN node 104". On reception of said STRQ" message 566, the Core State Management module 412 (FIG. 4) of CSMN node 104" processes said message and searches its core state management data 413 for state associated with the End Node X 146 indicated in said message. State associated with End Node X 146 that was earlier stored is found and a State Transfer Update (STU") message 568 including said state and the identifier of End Node X 146 is sent to CSMN Node 104'. Now message 570 and the rest of the process described in FIG. 5 is completed as before.

State transfer in accordance with this invention may take place for a number of reasons. In one embodiment of this invention state transfer is initiated by an end node during a handoff process. The end node attempts to terminate connection with one access node and establish a new connection with another access node due to movement, in which case state transfer as part of a mobility management system, enables the efficient and speedy establishment of connectivity with the new access node with as little interruption as possible to the end node data communication. In one embodiment of this invention the state transfer method described is followed by a routing update message from the new access node or the end node redirecting any data traffic towards the new location of the end node. In one exemplary embodiment of this invention such a routing update would be in the form of Mobile IP registration, while in another embodiment would be a Mobile IPv6 binding update.

In an additional embodiment of this invention state transfer is initiated as part of the transition of an end node from an active state to a dormant state, where data communication is temporarily suspended. In this case state transfer ensures that when end node becomes active again at some future time and possibly at some different access node, connectivity can be initiated quickly and efficiently.

In a yet another embodiment of this invention state transfer is initiated when a link between an end node and an access node is lost, in which case the state transfer mechanism is used for robustness, since the end node may attempt to reconnect via another access node at a future time, again making the reconnection process quick and efficient.

Figure 9:
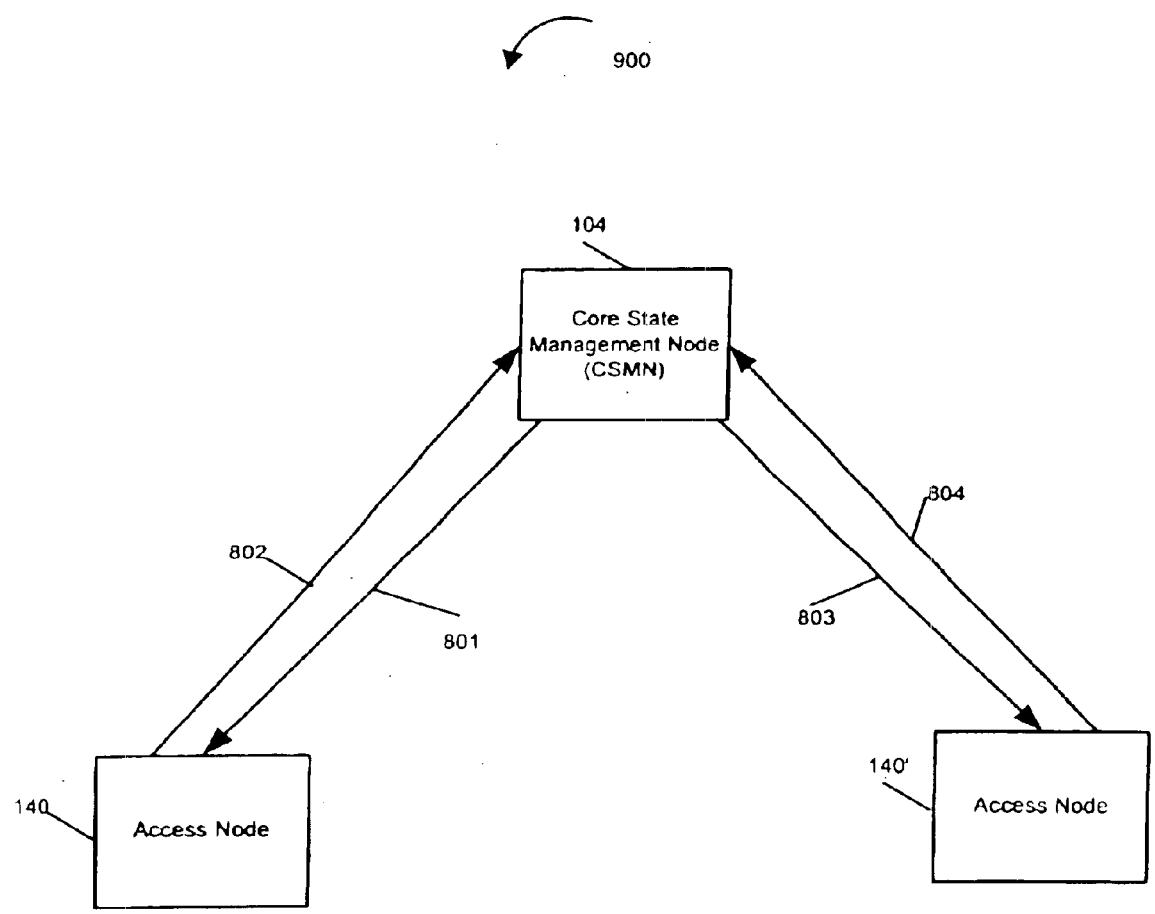
FIG. 9 illustrates a mechanism for CSMN polling of aggregated state from access nodes

FIG. 9 illustrates a communications system 800. FIG. 9 illustrates core state management signaling in a simplified version of the exemplary system depicted in the FIG. 5. FIG. 5 includes access nodes 140, 140' that is the same as, or similar to, the access nodes described in regard to FIG. 3. End node X 146 is the same as, or similar to, end node X 146 of FIG. 2. In addition, Core State Management Node (CSMN) 104 is the same as, or similar to, the CSMN of FIG. 4. Lines between the nodes of FIG. 9 represent state management related messages sent and received according to the present invention and are explained below.

In the FIG. 9 embodiment of the invention CSMN Node 104 periodically, or in response to some trigger event, sends Aggregated State Request (ASR) messages 801, 803 to access nodes 140, 140' respectively. These request messages 801, 803 represent a request for state information. On reception of said messages 801, 803, Access Nodes 140, 140' aggregate the current state information for end nodes associated with said Access Node and return it to the CSMN Node 104 via messages 802, 804 respectively. On reception of messages 802, 804 CSMN 104 de-aggregates the state and stores it in its memory per end node identifier. In this manner the CSMN 104 can control updating of its state information. This update technique can be used in combination with the previously discussed state update techniques. In on embodiment of this invention not all state is returned to the CSMN 104 but only the dynamic state that periodically changes.

In one embodiment of the invention Aggregated State Request (ASR) messages 801, 803 are sent one at a time in a round robin way but also periodically where the periodicity is preconfigured. In an alternative embodiment of this invention Aggregated State Request (ASR) messages 801, 803 are sent in a round robin way but at times were the loading on the server is below a preconfigured threshold. Alternatively, other techniques for scheduling and/or timing messages 801, 803 may be used.

In one embodiment of this invention state transfer is implemented overlayed on the AAA system, in which case state transfer messages are novel extensions to already existing AAA messages (e.g.: RADIUS messages) or they are novel AAA messages. In such an embodiment, the CSMN node may be implemented as a AAA server and belongs to a AAA hierarchy. In an alternative embodiment of this invention the CSMN node is a Mobile Home Agent in which case state transfer messages are implemented as novel extensions to already existing Mobile IP messages or as novel Mobile IP messages. In one embodiment of this present invention, the system is a cellular network. In such an embodiment the access nodes maybe implemented as access routers. Network nodes may be implemented as routers and end nodes may correspond to, e.g., be implemented as, mobile nodes.

Figure 10:
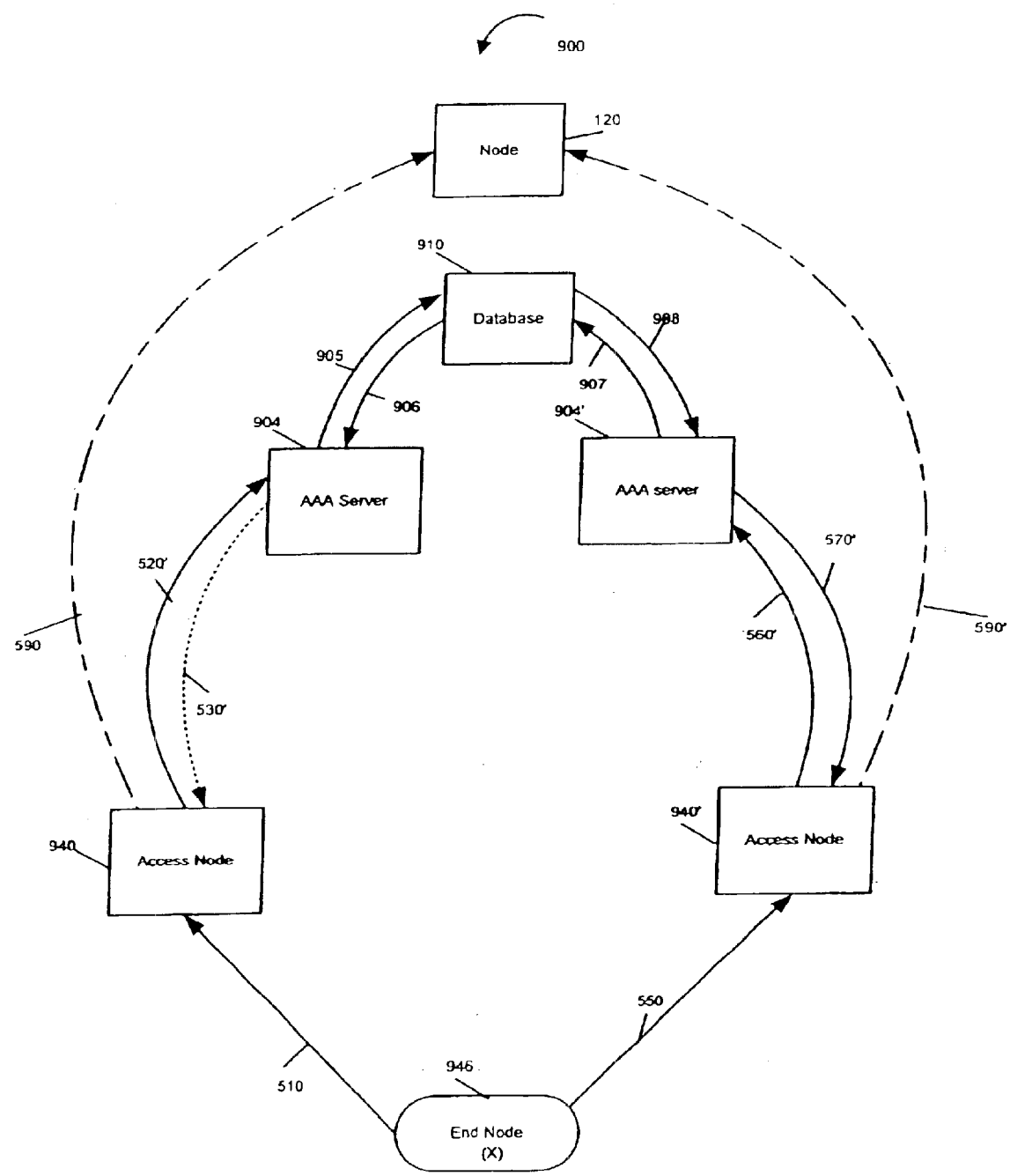
FIG. 10 illustrates an embodiment of this invention based on the AAA system

FIG. 10 illustrates a communications system 900 which uses a common state information database 910 that can be accessed by multiple server's, e.g., authentication, authorization and accounting (AAA) servers 904, 904'. State information can be retrieved and stored in the database 910 by individual servers 904, 904' in accordance with the present invention, e.g., as part of a handoff operation. The operation may involve a handoff of an end node 946 from a first access node 940 to a second access node 940'.

In the illustrated system 900 end node X 946 has communications links 510, 550 with the first and second access nodes 940, 940', respectively. The system 900 includes one or more additional nodes 120 which perform routing operations. The FIG. 10 system is similar to the system previously described in regard to FIG. 5 and can be implemented using the same or similar elements, e.g., access node and/or server circuitry. Notably the system in FIG. 10 differs from the FIG. 5 system in terms of where state information is stored in the network and the way in which servers access and update the state information. In the FIG. 10 embodiment, a database 910 which is external to the AAA servers 904, 904' is used to store state information. This allows multiple AAA servers to share a common state information database 910 avoiding the need to maintain a separate state information database in each AAA server 904, 904'. This also avoids the need to pass messages between AAA servers 904, 904' as part of a handoff operation as will now be explained in the context of an exemplary handoff operation. Furthermore, it increases the reliability of the system in that the failure of an individual AAA server, e.g.: AAA server 904, does not impact the state transfer process since any AAA server, e.g.: AAA server 904', can retrieve state that was put in the database 910 by any other AAA server e.g.: AAA server 904 connected in the same database 910.

AAA protocols use different sets of messages for Authentication/Authorization (also call AA) e.g.: Access Requests/Replies and different messages for Accounting (also called A) e.g.: Accounting Requests/Replies. Also the AA part of the AAA server typically just reads the database to retrieve the user profile. That is, the authentication/authorization part normally does not write in the database. The Accounting part of the AAA server, however, typically writes in the database to store the accumulated accounting information for a given end node. Typically the records created by the Accounting server are separate from those created by the AA part of the AAA server. The AA and A parts of the AAA system are logically considered to be one thing (i.e.: AAA), yet in some case the AA and A parts of the AAA system may be physically separated, e.g., on different servers which comprise part of the database 910.

In one embodiment of the invention depicted in FIG. 5, messages 520', 530', 560' and 570' are implemented based on new and novel extensions to Authentication/Authorization messages. In FIG. 10 End Node X 946 sends, e.g., at the start of a handoff, a Store State Request (SSRQ) message 510 to Access Node 940 comprising the End Node X 146 identifier. In one such implementation of the FIG. 10 embodiment, the end node identifier is the Network Access Identifier (NAI) typically in the format: user_name@realm. On reception of the SSRQ message 510 the Access Node 940 searches its State Management data 313 (FIG. 3) for state information associated with said end node and sends an Authentication/Authorization Access_Request message 520', equivalent to the AN-STU message 520 in FIG. 5, to the AAA Server 904. Said Access_Request message 520' comprises the End Node X 146 identifier (e.g.: NAI) and state associated with said end node as available to Access Node 140'. The state is transported in some cases in new and novel extensions to Access_Request messages. In one embodiment of this invention said extensions are Attribute-Value-Pairs (AVPs), where an Attribute is the type of state (e.g.: protocol ID) and Value is the actual state information. In an alternative embodiment one AVP is used with Attribute an indicating general state and Value including all state associated with said end node 946 now carried as an opaque object.

On reception of the Access_Request message 520' the AAA Server 904 processes the message and sends a database_write message 905 to the database to store the state included in said message such that said state is associated with the identifier of the end node also included in said message. The database 910 returns a database_write_ack message 906 to the AAA server 904 indicating the success of the write operation. The AAA node 904 also returns a novel version of Access_Accept message 530' to Access Node 940 indicating the correct reception and storage of said state, rather than the typical grant of access to an end node.

End Node X 946 sends a Retrieve State Request (RSRQ) message 550 to Access Node 940' comprising the End Node X 146 identifier (e.g.: its NAI). On reception of said RSRQ message 550 Access Node 940' sends a Authentication/Authorization Access_Request message 560' (equivalent to STRQ message 560 in FIG. 5) comprising the identifier of End Node X 146 (e.g.: its NAI) to the AAA Server 904'. Note that message 560' is shown to be sent to an AAA server, i.e.: AAA Server 904' that is different from the server to which the earlier message 520' was directed. This is shown to illustrate that it is not required all the Access Nodes (e.g.: 940, 940') use the same AAA server (904 or 904') as long as the AAA servers (904 and 904') can access the same database 910.

On reception of said Access request message 560', AAA Server 904' processes said message and sends database_read message 907, comprising the end node 946 NAI, to database 910. On reception of message 910 the database searches its memory for state information associated with the End Node X 946 indicated in said database_read message. State associated with End Node X 946 that was earlier stored is found and a the database 910 returns the state in message 908 to the AAA server 904'. On reception of said message 908, AAA server 904' sends Access_Accept message 570' (equivalent to CSMN-STU message 570 in FIG. 5) to Access Node 940' including said state and the NAI of End Node X 946.

On reception of Access_Accept message 570', Access Node 940' stores state included in said message in its state management data 313 (FIG. 3) and grants access to end node 946.

In one embodiment of this invention it is possible that on reception of message 907 the database 910 has no dynamic state associated with said end node 946. In this case database 910 may have static state associated with end node 946 in the form of user profile that is not context transferred. In this case the static state for end node 946 is returned to AAA Server 904' via message 908. In this case AAA server 904' may start normal authentication procedures between itself and End Node 946 before it returns Access_Accept. This characteristic of the invention integrates normal end node authentication with context transfer creating a consistent and robust method for accepting end nodes into the system wither for the first time or following a handoff.

The same or similar functionality can be implemented based on the Accounting part of the AAA server by any expert in the art.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A communications method for use in a communications system including a first access node, a second access node and a mobile node, the method comprising:

operating the mobile node to transmit a signal to the first access node to transfer state information;

communicating state information between the first access node and the second access node in response to said signal transmitted to the first access node, wherein said step of communicating state information between the first access node and the second access node includes:

operating the first access node to communicate said state information to a first network node coupled to said first access node and said second access node;

operating the first network node to store said state information; and operating the first network node to communicate said state information to said second access node, wherein the step of operating the first network node to communicate said state information to said second access node includes:

operating the first network node to communicate said state information to said second access node in response to a signal received by said first network node from said second access node.

2. The method of claim 1, further comprising:

operating said second access node to generate said signal received by said first network node in response to a signal received from said mobile node.

3. The method of claim 2, further comprising the step of:

operating the second access node to check to determine if it has received state information corresponding to said mobile node prior to generating said signal received by said first network node.

4. A method of implementing a communications system including an end node, a first access node, a second access node and a first network node coupled to said first and second access nodes, said end node being coupled to at least one access node through which said end node can communicate with elements of said communication system, the method comprising:

storing state information in said first network node which can be used by either of said first and second access nodes to support communications with said end node;

updating the state information stored in said first network node with state information supplied by the first access node in response to a trigger event, said trigger event being an event in a group of events consisting of: receipt by said first access node of a signal and a detection of a loss of communication with said end node;

operating said second access node to receive a signal from said end node indicating that state information corresponding to said end node should be retrieved;

operating said second access node to transmit a message requesting state information corresponding to said end node, wherein operating said second access node to transmit a message requesting state information corresponding to said end node includes transmitting a message from said second access node to said first network node; and operating the second access node to use at least some of said state information that was stored in said first network node to support a communications session involving said end node following a handoff of said end node from said first access node to said second access node.

5. A method of implementing a communications system including an end node, a first access node, a second access node and a first network node coupled to said first and second access nodes, said end node being coupled to at least one access node through which said end node can communicate with elements of said communication system; said system further includes a second network node, said second network node being in said second network region and coupling said first network node to said second access node; said communications system further including a third network node, said third network node coupling said first network node to said second network node and being accessible from both said first and second network regions; the method comprising:

storing state information in said first network node which can be used by either of said first and second access nodes to support communications with said end node;

updating the state information stored in said first network node with state information supplied by the first access node in response to a trigger event, said trigger event being an event in a group of events consisting of: receipt by said first access node of a signal from said end node, a request for a state information update from said first network node, and a detection of a loss of communication with said end node;

operating said second access node to receive a signal from said end node indicating that state information corresponding to said end node should be retrieved;

operating said second access node to transmit a message requesting state information corresponding to said end node; operating the second access node to use at least some of said stored state information to support a communications session involving said end node following a handoff of said end node from said first access node to said second access node;

communicating state information corresponding to said end node, from said first network node to said second network node; and providing said second access node with at least some of said communicated state information corresponding to said end node, wherein said first access node and said first network node are in a first network region, said second access node being in a second network region;

wherein operating said second access node to transmit a message requesting state information corresponding to said end node includes transmitting a message from said second access node to said second network node; and wherein communicating state information corresponding to said end node, from said first network node to said second network node includes transmitting the communicated state information through said third network node.

6. The method of claim 5, wherein each of said first, second and third network nodes are authorization servers.

7. The method of claim 5, wherein each of said first, second and third network nodes are accounting servers.

8. The method of claim 5, further comprising:
storing state information obtained from said first access node, corresponding to said end node, in each of said second and third network nodes.

9. A method of implementing a communications system including an end node, a first access node, a second access node and a first network node coupled to said first and second access nodes, said end node being coupled to at least one access node through which said end node can communicate with elements of said communication system, the method comprising:
storing state information in said first network node which can be used by either of said first and second access nodes to support communications with said end node;
updating the state information stored in said first network node with state information supplied by the first access node in response to a trigger event, said trigger event being an event in a group of events consisting of: receipt by said first access node of a signal from said end node, a request for a state information update from said first network node, and a detection of a loss of communication with said end node; and
operating the second access node to use at least some of said stored state information to support a communications session involving said end node following a handoff of said end node from said first access node to said second access node,
wherein said first network node includes a database which is accessible by said first and second access nodes, and wherein said first and second access nodes access said database through first and second authorization servers, respectively.

10. The method of claim 9, wherein said database is incorporated into a third authorization server.

11. The method of claim 9, wherein said first network node and said first authorization server are located in a first network region, said first authorization server providing authorization information only to nodes included in said first network region;
said second authorization server and said second network node being in a second network region, said second authorization server providing authorization information only to nodes included in said second network region; and
said database providing state information to said first and second authorization servers.

12. A method of implementing a communications system including an end node, a first access node, a second access node and a first network node coupled to said first and second access nodes, said end node being coupled to at least one access node through which said end node can communicate with elements of said communication system, the method comprising:
storing state information in said first network node which can be used by either of said first and second access nodes to support communications with said end node;
updating the state information stored in said first network node with state information supplied by the first access node in response to a trigger event, said trigger event being an event in a group of events consisting of: receipt by said first access node of a signal from said end node, a request for a state information update from said first network node, and a detection of a loss of communication with said end node;
operating the second access node to use at least some of said stored state information to support a communications session involving said end node following a handoff of said end node from said first access node to said second access node, wherein said first network node includes a database which is accessible by said first and second access nodes, and wherein said first and second access nodes access said database through first and second accounting servers, respectively.

13. A method of implementing a communications system including an end node, a first access node, a second access node and a first network node coupled to said first and second access nodes, said end node being coupled to at least one access node through which said end node can communicate with elements of said communication system, the method comprising:
storing state information in said first network node which can be used by either of said first and second access nodes to support communications with said end node;
updating the state information stored in said first network node with state information supplied by the first access node in response to a trigger event, said trigger event being an event in a group of events consisting of: receipt by said first access node of a signal from said end node, a request for a state information update from said first network node, and a detection of a loss of communication with said end node;
operating the second access node to use at least some of said stored state information to support a communications session involving said end node following a handoff of said end node from said first access node to said second access node; and
operating said first access node to detect the cessation of communications with said end node received via a wireless link, said detection of the cessation of communication triggering the first access node to transmit state update information to be stored in said first network node.

14. A method of implementing a communications system including an end node, a first access node, a second access node and a first network node coupled to said first and second access nodes, said end node being coupled to at least one access node through which said end node can communicate with elements of said communication system, the method comprising:
storing state information in said first network node which can be used by either of said first and second access nodes to support communications with said end node;
updating the state information stored in said first network node with state information supplied by the first access node in response to a trigger event, said trigger event being an event in a group of events consisting of: receipt by said first access node of a signal from said end node, a request for a state information update from said first network node, and a detection of a loss of communication with said end node;
operating the second access node to use at least some of said stored state information to support a communications session involving said end node following a handoff of said end node from said first access node to said second access node; and operating said first access node to receive a request for a state information update from said first network node, said received request triggering the first access node to transmit state update information to be stored in said first network node.

15. The method of claim 14, wherein said transmitted state update information includes state information corresponding to a plurality of end nodes coupled to said first access node.

16. The method of claim 14, further comprising:

operating said first network node to periodically transmit said request for a state information update to said first access node.

17. A communications system used to provide communications services to a plurality of end nodes, said communication system comprising:

a plurality of access nodes, each one of the access nodes storing state information used to provide communications services to end nodes coupled to said one of the access nodes;

a first core node coupled to said plurality of access nodes, said core node including:
  i. state information received from a first one of said access nodes; and
  ii. means for communicating said state information to a second one of said access nodes following a handoff from said first one of said access nodes to a second one of said access nodes, wherein said first core node is in a first region of said communication system, the system further comprising:

a second core node located in a second communications region; and a third core node coupled to said first and second core nodes, said third core node being used to transfer state information from said first core node to said second core node when a mobile node passes from said first region to said second region.

18. The communication system of claim 17, wherein said first, second and third core nodes are part of an accounting and authorization system.

19. The communication system of claim 17, wherein said first, second and third core nodes each store at least some state information, obtained from the first access node, corresponding to said mobile node.

20. A method of supporting handoffs from a first access node to a second access node in a communications network including said first and second access nodes, a mobile node, a first network node coupled to said first and second access nodes, a second network node, and a third network node, said first, second, and third network nodes being arranged in a hierarchical relationship with said third network node coupling said first network node to said second network node, the method comprising:

storing state information corresponding to said mobile node in both said first access node and said first network node;

updating the state information corresponding to said mobile node stored in said first network node with state information obtained from said first access node;

supplying said updated state information stored in said first network node to said second access node as part of a handoff of said mobile node from said first access node to said second access node;

storing said updated state information corresponding to said mobile node in said third network node in addition to said first network node; and operating said second network node to retrieve said updated state information from said third network node in response to a state transfer request message corresponding to said mobile node.

* * * * *